(12) United States Patent
Basson et al.

(10) Patent No.: US 7,474,335 B2
(45) Date of Patent: Jan. 6, 2009

(54) METHOD, APPARATUS AND PROGRAM STORAGE DEVICE FOR IMAGE POSITION STABILIZER

(75) Inventors: Sara H. Basson, White Plains, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 09/774,488

(22) Filed: Jan. 31, 2001

(65) Prior Publication Data

US 2002/0101510 A1 Aug. 1, 2002

(51) Int. Cl.
H04N 5/228 (2006.01)
H04N 5/225 (2006.01)
H04N 7/18 (2006.01)

(52) U.S. Cl. .................. 348/208.99; 348/169; 348/61

(58) Field of Classification Search .......... 348/208.1, 348/208.2, 208.4, 208.13, 169, 61, 207.1, 348/373, 208.14, 208.99, 78, 121, 115; 382/103
See application file for complete search history.

(56) References Cited

U.S. PATENT DOCUMENTS

| | | | | |
|---|---|---|---|---|
| 5,281,957 A | * | 1/1994 | Schoolman | 345/8 |
| 5,561,498 A | * | 10/1996 | Sekine et al. | 396/53 |
| 5,734,933 A | * | 3/1998 | Sekine et al. | 396/55 |
| 5,948,047 A | * | 9/1999 | Jenkins et al. | 708/141 |
| 5,953,054 A | * | 9/1999 | Mercier | 348/50 |
| 6,115,482 A | * | 9/2000 | Sears et al. | 382/114 |
| 6,157,404 A | * | 12/2000 | Marshall et al. | 348/216.1 |
| 6,211,903 B1 | * | 4/2001 | Bullister | 348/14.16 |
| 6,342,915 B1 | * | 1/2002 | Ozaki et al. | 348/61 |
| 6,356,392 B1 | * | 3/2002 | Spitzer | 359/630 |
| 6,497,649 B2 | * | 12/2002 | Parker et al. | 600/27 |

* cited by examiner

*Primary Examiner*—Luong T Nguyen
(74) *Attorney, Agent, or Firm*—Ference & Associates LLC (57) ABSTRACT

Apparatus, and associated methods, for stabilizing an image. The apparatus includes an aiming device to be aimed at a moving image, a transforming device which transforms the image into a non-moving image; and a displaying device which displays the non-moving image. The apparatus and methods are of particular benefit, for example, to individuals with Parkinson's disease and/or individuals attempting to work on a laptop computer or read a book while travelling via airplane, boat, train or road vehicle.

22 Claims, 6 Drawing Sheets

METHOD, APPARATUS AND PROGRAM STORAGE DEVICE FOR IMAGE POSITION STABILIZER

FIELD OF THE INVENTION

The present invention relates generally to items that normally provide optical assistance, such as eyewear, as well as to screens and the like that display images. The present invention relates more particularly to the use of the aforementioned items in less than ideal circumstances, such as when the user's field of vision, or the image(s) being viewed, are unstable.

BACKGROUND OF THE INVENTION

Eye strain and fatigue have long been recognized as undesirable consequences presented to individuals attempting to read or do close work under given conditions or in given medical contexts. For instance, an individual suffering from Parkinson's disease may experience eye strain and fatigue when reading a book since the person's hands may be shaking too much.

Other problems may be encountered by any individual when attempting to read or do close work in or on a moving vehicle. For example, when an individual attempts to read a book while riding in a car, his or her eyes will almost inevitably grow tired since the book will likely be shaking continually. On the other hand, an individual riding in an airplane, along with reading material or another subject of close work, may be shaking at a constant rate due to turbulence experienced by the plane. Similar problems may be encountered on a boat. Thus, all of these vehicular movement issues will typically affect the manner in which an individual visually perceives his or her environment, leading almost inevitably to eye strain and fatigue and possibly leading to nausea. Normally, a recommended solution for "sea-sickness", "air-sickness" or "car-sickness" in instances such as these is to look at a perceptually stationary entity, such as the horizon.

However, a need has been recognized in connection with proceeding beyond simplistic solutions for relieving eye strain and fatigue, and feelings of nausea, in the context of vehicular movement, and to provide somewhat of a user-friendly mechanism to attend to such matters. A need has also been recognized in connection with attending to such matters, in a similar manner, in connection with medical issues that might affect an individual regardless of whether he or she is in vehicular transit.

SUMMARY OF THE INVENTION

In accordance with at least one presently preferred embodiment of the present invention, a method, apparatus and program storage device, are broadly contemplated wherein an individual may wear a special pair of eye glasses or head mounted display that is connected to a camera. The image recorded by the camera may then be displayed on the eyeglasses in a way that it is not shaking in front of the eyes of the wearer. For example, a book that is being read by an individual with Parkinson's and, in the process, may be shaking, can preferably be recorded by a camera and is sent through an object recognition device that recognizes and tracks the book. If the book appears to have moved from a stationary position, the device may thence adjust for such movement and display the book on the eye glasses by special projectors so that it appears not to be shaking, thus enabling the reader to enjoy the book without getting sick or frustrated. A similar solution may be applied to the problem of somebody reading in a car or other vehicle, where the image of the book, newspaper, etc., being read may be projected onto eye glasses of the reader in such a way as to appear virtually immobile.

In another embodiment of the present invention, if an individual is looking at the lap-top or other computer, or even an e-book, and it is shaking (e.g. when riding in a car or train) then the image on the lap-top may preferably be adjusted such that its vibrations relative to the motion of the user's eye are dampened or even eliminated in order to keep the user from feeling sick. A camera on the lap-top may preferably note the position of the user's eye and its motion. An intelligent device within the laptop will preferably display the image on the screen of the laptop so that its motion is always relative to that of the user's eyes. A similar mechanism may be used for somebody reading on an airplane or other vehicle. In such instances, the person's glasses may register the object as being read as if on the horizon (i.e., virtually stationary), thereby preventing the person from becoming sea-sick, air-sick or otherwise feeling unwell.

In one aspect, the present invention provides an apparatus for stabilizing an image, the apparatus comprising: an aiming device to be aimed at a moving image; a transforming device which transforms the image into a non-moving image; and a displaying device which displays the non-moving image.

In another aspect, the present invention provides a method of stabilizing an image, the method comprising the steps of: providing an aiming device; aiming the aiming device at a moving image; transforming the image into a non-moving image; and displaying the non-moving image.

Furthermore, the present invention provides, in another aspect, a program storage device readable by machine, tangibly embodying a program of instructions executable by the machine to perform method steps for stabilizing an image, the method comprising the steps of: providing an aiming device; aiming the aiming device at a moving image; transforming the image into a non-moving image; and displaying the non-moving image.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
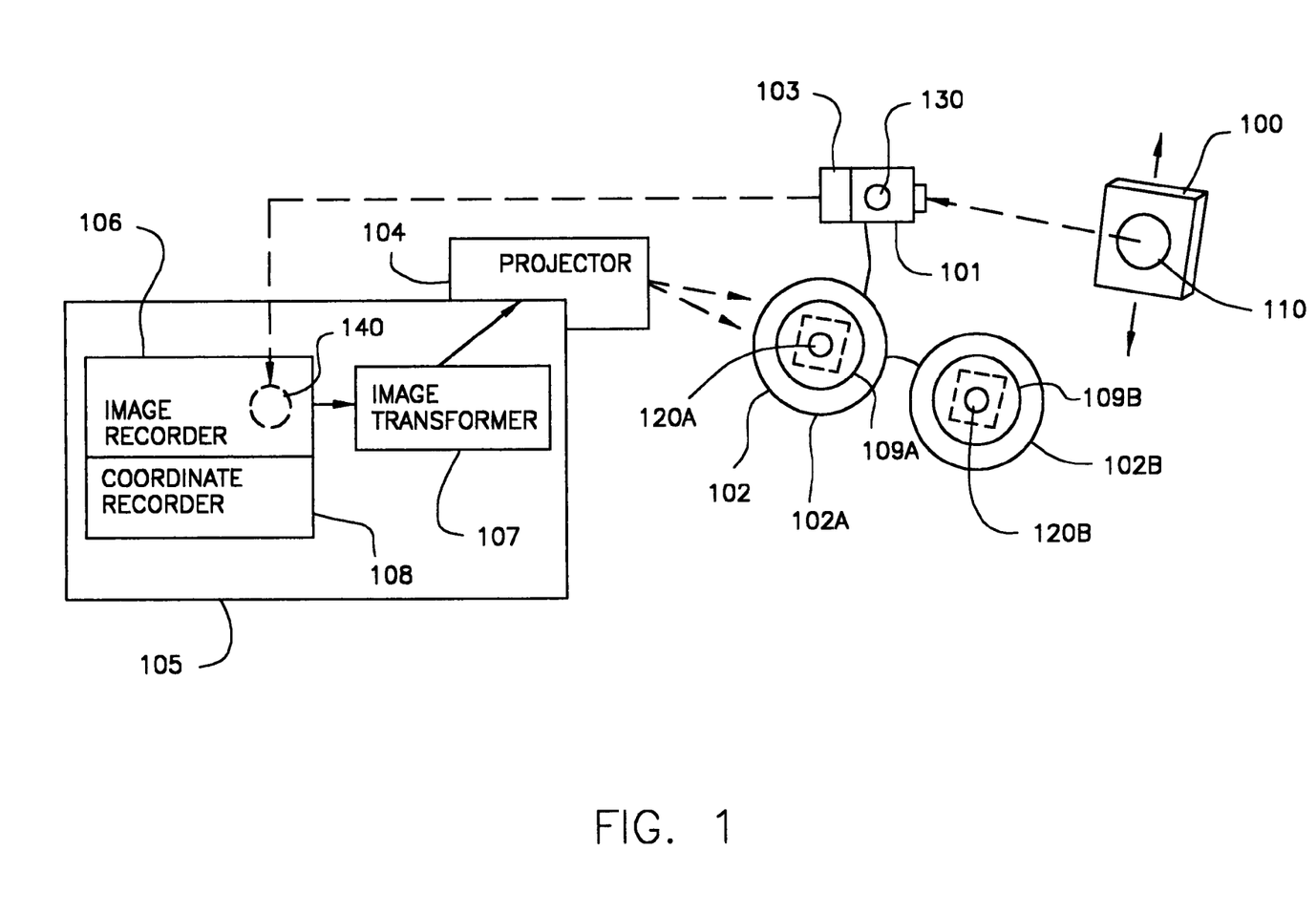
FIG. 1 schematically illustrates an embodiment of the present invention involving eyewear.

FIG. 1 schematically illustrates an embodiment of the present invention involving eyewear. Indicated at 100 is a hypothetical object that is shaking (e.g., moving up and down). This object 100 may be a book, laptop, magazine, as well as many other things. The object 100 includes an image 110, which is also shaking.

Indicated at 102 are the eye glasses (or other eyewear, such as goggles) of the users where 102b represents the right side of the glasses and 102a represents the left side. The glasses 102 preferably have a camera 101 attached (though the camera need not necessarily be attached and in fact can be located remotely). Camera 101 is preferably connected to a computer 105, and any image information sent through the camera 101 thus preferably progresses through a CPU 103. CPU 103 is preferably adapted to determine how the camera 101 is moving, shaking or vibrating relative to eyeglasses 102.

Information relating to how the camera 101 is moving, as well as the image 110 (whose presence in the camera is indicated at 130) enters an image recorder 106 and a coordinate recorder 108. The coordinate recorder 108 records and stores information about how the camera is moving. The image recorder 106 contains the image (indicated there at 140) that was observed by the camera 101.

Information from the image recorder 106 and coordinate recorder 108 is sent to an image transformator 107 which transforms the image so that it appears as though it is not moving in the glasses 102 of the wearer. The image so transformed is sent through the projector 104 and displayed on the left and right lenses 109a/b of the user's eye glasses. An image is thus displayed at 120a on the left lens 109a and at 120b on the right lens 109b. It is assumed here that the glasses 102 are stationary relative to the person's eyes; therefore, if the image is displayed relative to the movement of the eye glasses 102 then it will appear stationary to the user. Preferably, there will be some shift in the left and right images 120a/b with respect to each other, in known manner, so as to invoke the perception of a three-dimensional image. Thus, it is possible to create an illusion of depth of field using two images due to stereo imaging phenomena. However, most displays have a fixed depth of focus which would restrict the placement of an image to be transformed at different focal lengths. Presumably, techonologies still to be developed might remove these restrictions. For present purposes, it should be understood that it is not essential that a transformed image be displayed in both eyes.

Figure 2:
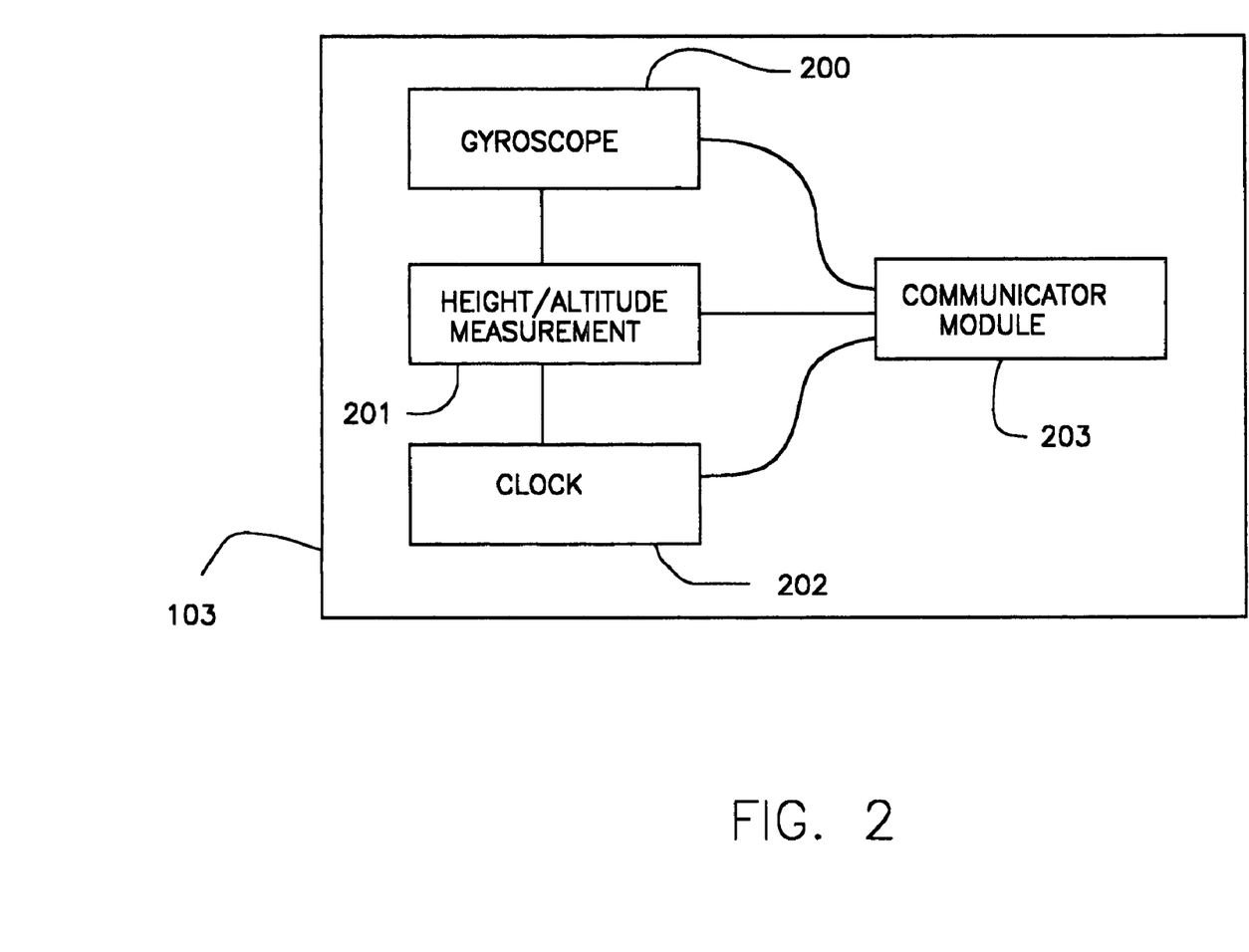
FIG. 2 is a schematic representation of a CPU from FIG. 1.

FIG. 2 is a schematic representation of the CPU 103 from FIG. 1, that is, the computer device attached to the camera 102. In one embodiment, CPU 103 may preferably include a gyroscope 200 that identifies how the camera 102 is angled with respect to a vertical axis. Indicated at 201 is a height or altitude measurement device which contains a sensor that identifies the height, with respect to some stationary entity, such as the ground, of the camera/glasses device 101/102. Indicated at 202 is a clock that measures and records the time at which any motions of the camera/glasses device 101/102 occurred. This information is sent to a communication module 203. The information from the gyroscope 200 and the height measurer 201 thus provides an essentially complete sense of the movements of the camera 101 connected to the glasses 102. The information from the communication module 203 enters the image recorder and coordinate recorder, 106 and 108. The image recorder 106 receives the actual image data whereas the coordinate recorder 108 receives information recorded in 200 and 201.

Figure 3:
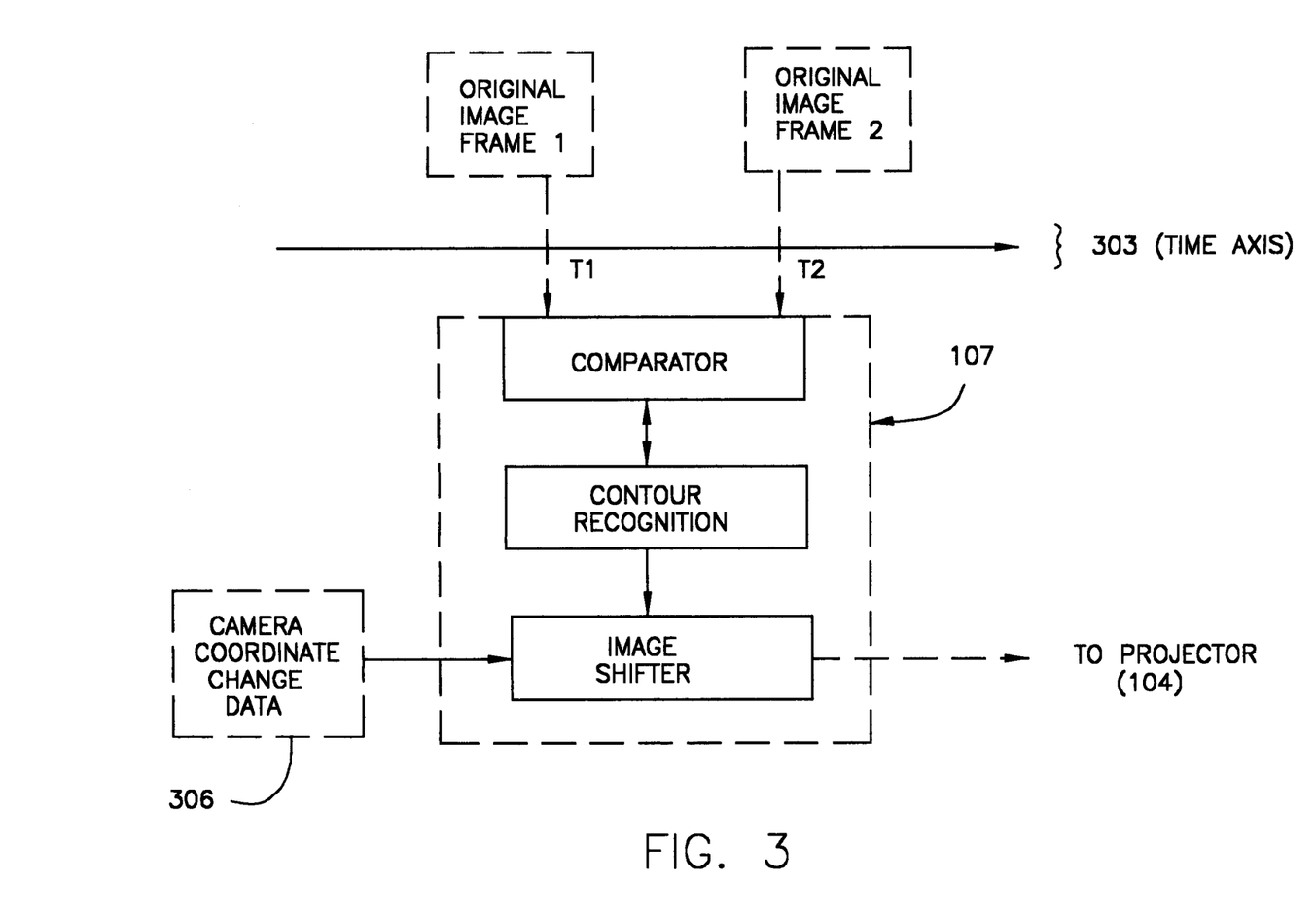
FIG. 3 schematically illustrates an image transformator.

FIG. 3 is an illustration of the image transformator 107. Continued reference is also made to FIG. 1. The input for the image transformator 107 is shown as original image frames 301 and 302, time-stamped at 303 with times t1 and t2. The original image frames 301/302, indeed, correspond to the image 130 that was recorded by the camera 101 and that entered the image recorder 106. The original image frames 301/302 may preferably be taken at specific time intervals. These time intervals could conceivably depend upon the situation, e.g., how quickly the images are moving/shaking. If, for example, a person is holding a book in a car and the vibrations of the book are relatively slow, then the intervals of time at which a picture of the book is taken can be relatively longer. If a person reading a book has Parkinson's disease and the hand holding the book is shaking relatively fast, then the intervals at which a picture of the book is taken can preferably be much smaller. Indicated at 306 are camera coordinate change data entering the image transformator 106.

The image frames 301 and 302 are preferably input into a comparator 304 which compares the frames and, particularly, how the images have changed. For example, if the system sees that the user is reading a book (page remaining the same) then the system can display the book with incremental movements just to keep the display natural. In order to "see" that the user is reading a book, a known manner of object recognition may be utilized, such as that described in copending and commonly assigned U.S. patent application Ser. No. 09/238,245, filed on Jan. 28, 1999 ("A Virtual Map System and Method for Tracking Objects"). If, on the other hand, the person is turning a page, then the system must recognize that if the motions it records do not result in identical display of object being observed then the motions must be deliberate and not motions of the car. Contour image recognition occurs at 305; that is, the contours of an object are recognized.

A rationale for including contour image recognition is that, as a general rule, people tend to look at what is written in a book and not at the contours of the book itself For example, if a person is watching television, the content itself is changing but not the contours of the television. Therefore, in such cases it can be necessary to compare the contours of the television at different times.

Comparator 304 and contour recognizer 305 preferably communicate between themselves. It is possible that contours of the same image will be compared at different times.

After it has been determined how the contour of an image has moved, this information preferably enters an image shifter 307 along with information 306 relating to the change in camera coordinates. The information about how the object has moved is thence compared to how the camera has moved.

Preferably, the position at which the image "should" be displayed relative to the last display is computed by just enough to account for the motion of the camera. For example, if the contour (e.g. of a book) has shifted 3 cm up and the camera has shifted 1 cm up then the image shifter 307 will preferably serve to move the object display 2 cm down. Similar computations are preferably made with respect to horizontal and rotational coordinates. If, for example, the contour of the objects shifts 30 degrees in direction "A" whereas the camera shifts 15 degrees in a direction opposite to "A", then the image shifter 307 will preferably account for this by displaying the image at −15 degrees with respect to direction "A". The shifter 307 thus serves to make the object appear as though it has not moved. The image is then preferably sent to the projector 104.

Figure 4:
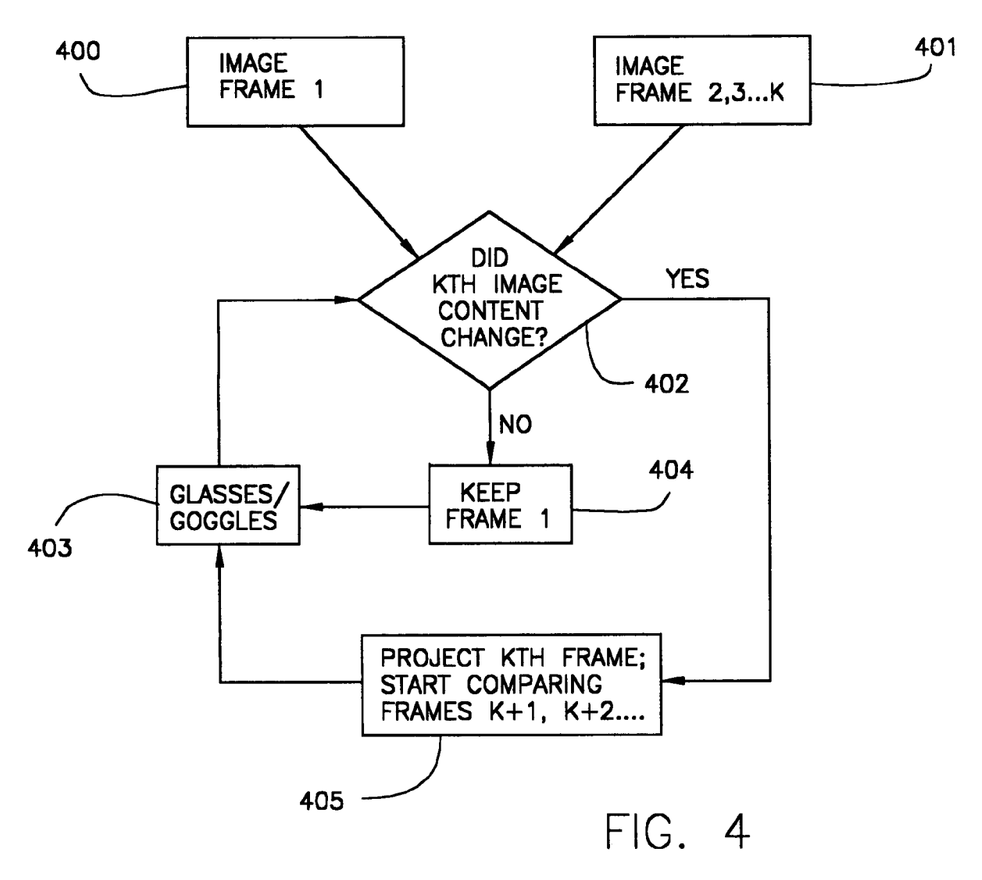
FIG. 4 is a flow diagram depicting the function of a transformator such as that shown in FIG. 3.

For as long as the user has not replaced the object being viewed or read, the eyeglasses will preferably contain a constant picture of the original image taken at time t1, as will be better appreciated from FIG. 4. Only when a person turns the page or puts the object down will the image in the glasses change. This method is applicable when the person only needs to see what he/she is reading. In other words, if a person reads a book, he/she will need to see the picture of a page that s/he currently reads. He/she can read an image of the page, as captured by the camera. When he/she finishes reading the page, he/she can turn the page and the camera captures a new picture that will be displayed for the reader, and so on.

FIG. 4 provides a flow chart of which elaborates on how the transformator from FIG. 3 may work. It depicts a situation in which an image frame is taken at a time interval and this image is displayed on the user's eye glasses until a deliberate (e.g., page turning) motion is made. This is possible only if the person is, for example, reading a book and then the initial image is displayed until the system registers that the user has turned the page and it again takes and initial image frame at that time of the new page.

Image frame 1 (i.e. the first image frame) is indicated at 400. Subsequent image frames 2, 3, . . . K are indicated at 401. At step 402, it is determined as to whether the last image content has changed by comparing the latest image taken with the one before it. If the content did not change, then the system opts to keep the initial frame 404 displayed on the glasses 403. If the answer to the question at 402 question, i.e., "Did the kth image content change?", is "yes", then the Kth frame is displayed on the glasses 403 and step 405 takes place, in which there is a continual comparison of frames k+1, k+2, . . .

Figure 5:
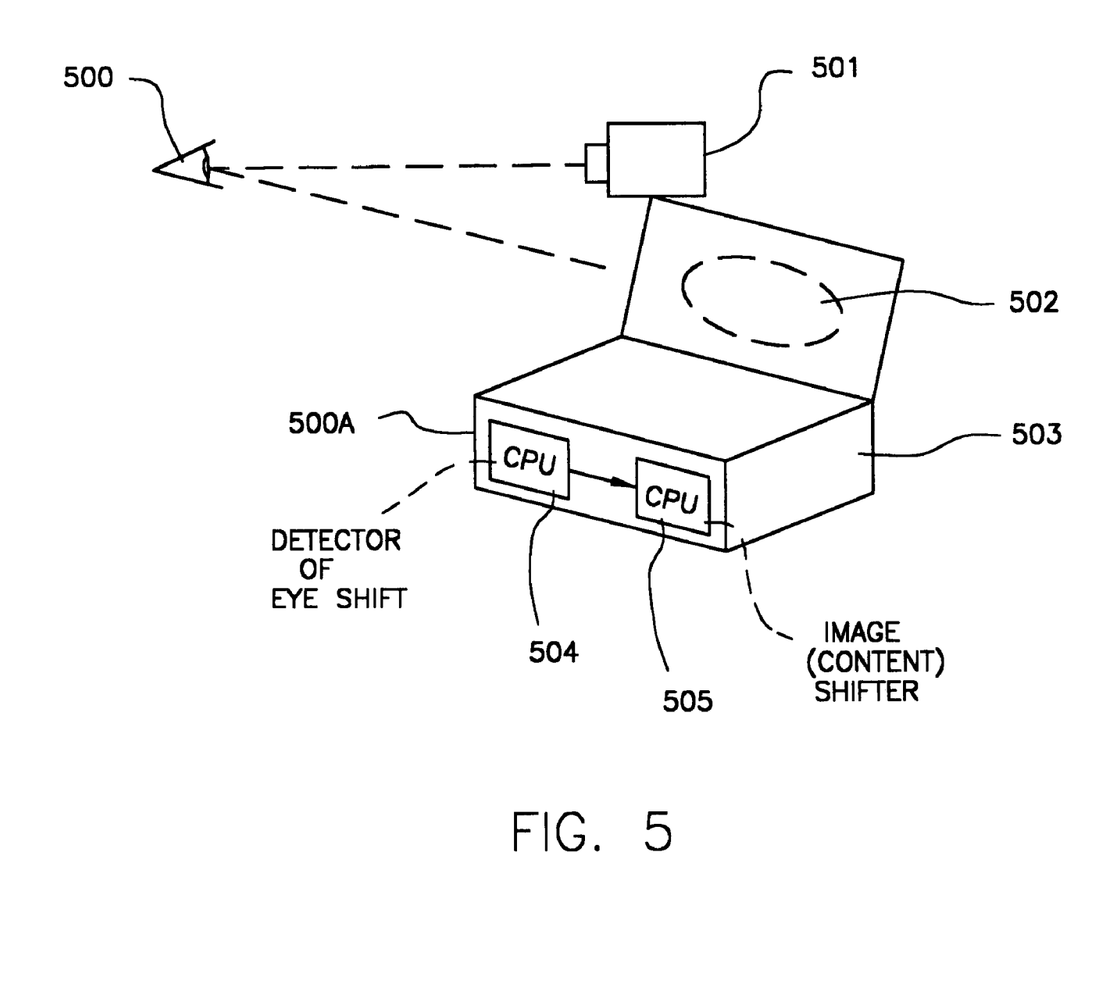
FIG. 5 schematically illustrates an arrangement for stabilizing an image on a laptop computer.

FIG. 5 depicts a different method, in which an image is stabilized an on a lap-top without the user making use of the inventive eyeglass arrangement discussed above. Indicated at 500 is the eye of a person looking at the display of a lap-top 500a. A camera 501 is fixedly mounted on the lap-top. The laptop display preferably contains an image or other visual content 502, which may be a book, a text document, a movie, a graphical image, etc . . . Indicated at 503 is a running application on the lap-top. Indicated at 504 is an eye shift detector which will preferably note how the user's eye is moving relative to the image 502 displayed on the lap-top. The detector 504 preferably functions analogously to the image transformator 107 described heretofore. Depending on the data received from the detector of eye shift 504, the image (content) shifter 505 will preferably move the image being displayed on the laptop in a manner that will make the image appear immobile to the user. Widely available technology currently exists for detecting eye shift; examples of such technology may be found at http://www.lctinc.com/doc/linksem.htm.

Figure 6:
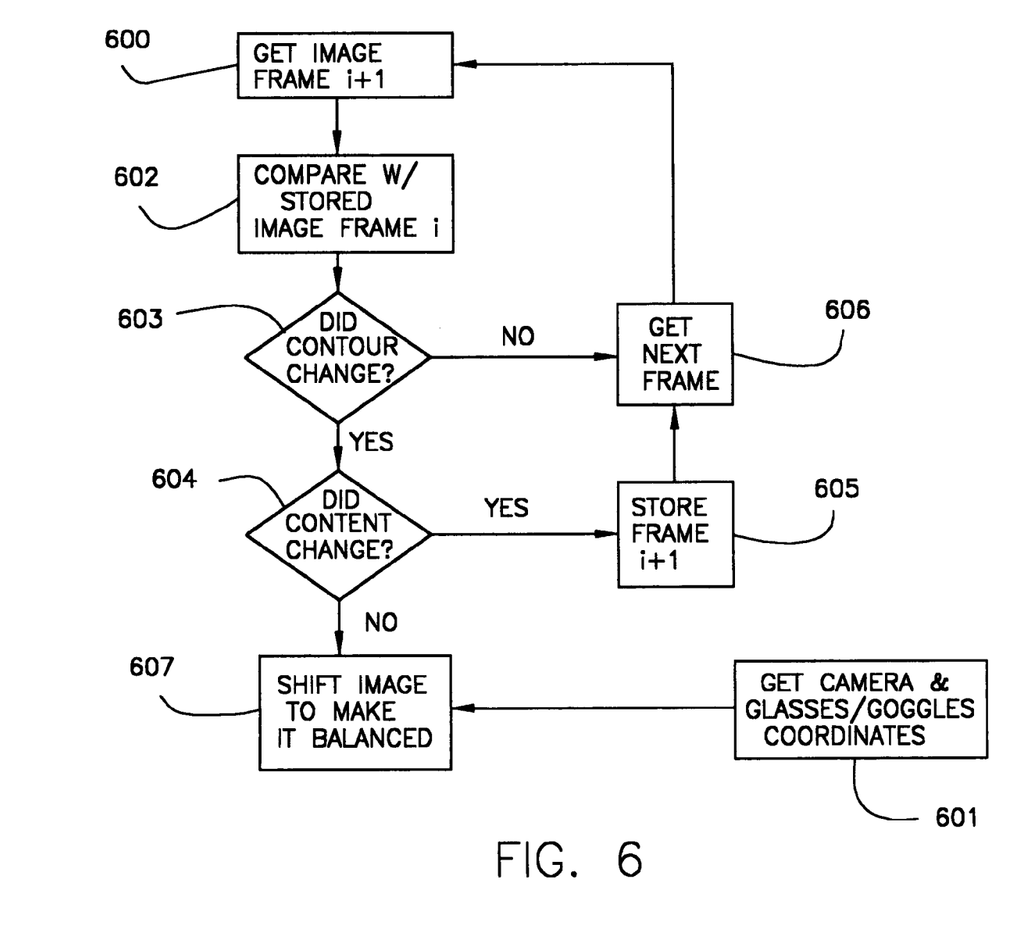
FIG. 6 is a flow diagram depicting several basic steps applicable to different embodiments of the present invention.

FIG. 6 is a flowchart of a process in accordance with at least one embodiment of the present invention, and in fact may relate to a wide range of embodiments, including "eyeglasses" and "laptop" embodiments. Step 600 involves getting the image frame i+1. Step 602 involves comparing the image i+1 with the previously stored image i. Step 603 involves analyzing whether the image contour has changed. If the contour did not change, then the system gets the next image frame 606, which returns the process back to step 600. If the image contour did change, then it is queried at step 604 as to whether the content has changed. If the content has not changed, then the camera/glasses coordinates are obtained at 601 and the image is shifted to make it balanced, at step 607. If the content did change, then frame i+1 is stored and, at step 606, the next frame is obtained.

The disclosure now turns to a discussion of various components that may be utilized in accordance with the embodiments of the present invention.

An eyeglasses-based microdisplay system, as generally depicted in the figures, is available from MicroOptical Corporation (Westwood, Mass.). A wide variety of other head-mounted display systems (e.g. glasses and/or goggles) may be used, e.g. the ergonomic wearable personal display from Invisio Inc. (Sunnydale, Calif.); and the compact optical display system associated with the wearable personal computer from IBM Corporation (Armonk, N.Y.) as described for example, in U.S. patent applications Ser. Nos. 09/437,972 (filed Nov. 10, 1999), 09/437,793 (filed Nov. 10, 1999), and 29/110,706 (filed Sep. 10, 1999).

The miniature projectors contemplated herein are preferably located inside the head-mounted glasses/goggles device. The projectors are preferably configured for projecting computer screens on a suitable area, such as a lens area visible to the user. Preferably, the effect will be that the user has impression that he or she is looking at a computer screen. Such projector arrangements can be small enough to fit in the frames of glasses or goggles. In one possible embodiment, the projected image can be projected on the lenses with the intermediary of a mirror and prism.

Conceivably, the eyeglasses/goggles, particularly the lenses or lens areas thereof, could be transparent or opaque. For instance, if it is desired that no projected image be confused with an actual image, the lens or lens areas of the eyeglasses/goggles could be opaque. The user would then need only "aim" the eyeglasses/goggles at the object for which the image transformation described heretofore is desired. Transparent lenses or lens areas, however, could be used in instances where viewing the actual (originating) image or object may be desired. Here, an overlayed image could be displayed on the lens with a distinct contrast as compared to the general background (e.g., the displayed matter could be much brigther than what is otherwise viewd through the lens).

In another conceivable scenario, it is possible for the image of a book to be "printed" (e.g. downloaded) into the lens or lens area of the glasses/goggles while a user is looking at a blank wall. In other words, the image of a book or other item to be read that is shaking or moving can be stabilized by downloading or "printing" text and/or images from the book or other item onto the lens or lens area of the glasses/goggles from CPU storage, rather than necessitating the user looking at the book (or other item to be read) in the first place. Thus, in such an instance, the glasses/goggles will not necessarily have to be "aimed" at the book or other item to be read when the user wishes to read it.

Among components that could be utilized for displaying a stabilized image in accordance with the embodiments of the present invention are: a head-mounted display, glasses/goggles, a laptop display, a TV, a telephone screen, a pager screen, or any of many other possible analogous items.

A projecting arrangement, for getting an image on a displaying arrangement, could include a projector, a TV tube, a computer, or any of many other possible analogous items.

A sensing arrangement, for sensing the position and/or state of a moving image that is to be transformed into a non-moving image, could include a gyroscope, camera, motion sensors, or any of many other possible analogous items.

It is to be understood that the present invention, in accordance with at least one presently preferred embodiment, includes an aiming device to be aimed at a moving image, a transforming device which transforms the image into a non-moving image, and a displaying device which displays the non-moving image. Together, the aiming device, transforming device and displaying device may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for stabilizing an image, said apparatus comprising:
   an aiming device to be aimed at a moving object having an image, wherein said aiming device comprises:
      a camera which records a moving image, wherein said camera is adapted to record successive discrete frames of the moving image; and
      eyewear, wherein said eyewear comprises at least one lens area for being viewed;
   a computer comprising:
      a clock which records a time at which a discrete frame is captured by the aiming device;
      a gyroscope which indicates how the aiming device is angled with respect to a vertical axis;
      a height measurement device which comprises a sensor that identifies a height with respect to a stationary entity;
      a coordinate recorder which receives information from the gyroscope, the height measurement device and the clock;
   a transforming device which transforms the image associated with the moving object, wherein the movement of said image is thereby reduced;
   a displaying device which displays the transformed image, wherein said displaying device comprises a projector which projects the transformed image on said at least one lens area;
   wherein said transforming device further comprises a controller processing unit which accepts data relating to the moving image from the aiming device and the coordinate recorder and transforms the data relating to the moving image into data relating to a non-moving image; and
   wherein said transforming device is further adapted to stabilize the moving image relative to an eye of an individual viewing the moving image by inputting the successive discrete frames into a comparator which compares and shifts the successive discrete frames as necessary to stabilize the image prior to projection of the image.

2. The apparatus according to claim 1, wherein said aiming device is adapted to be mounted on a human head.

3. The apparatus according to claim 2, wherein said aiming device comprises eyeglasses.

4. The apparatus according to claim 2, wherein said aiming device comprises goggles.

5. The apparatus according to claim 1, wherein said camera is adapted to record the moving image continuously.

6. The apparatus according to claim 1, wherein said transforming device is adapted to stabilize the moving image relative to an object external to an individual viewing the moving image.

7. The apparatus according to claim 1, wherein said at least one lens area is transparent.

8. The apparatus according to claim 1, wherein said at least one lens area is opaque.

9. The apparatus according to claim 1, further comprising a contour recognizer for recognizing an outer contour of the moving image.

10. The apparatus according to claim 1, wherein said moving object is reading material.

11. The apparatus according to claim 10, wherein said reading material is selected from the group consisting essential of: a book and a newspaper.

12. The apparatus according to claim 11, wherein said reading material being held by a person having Parkinson's disease.

13. A method of stabilizing an image, said method comprising the steps of:
   providing an aiming device, wherein said step of providing said aiming device comprises:
      providing a camera which records a moving image, wherein said camera is adapted to record successive discrete frames of the moving image; and
      providing eyewear, wherein said eyewear comprising at least one lens area for being viewed;
   providing a computer, wherein said step of providing said computer comprises:
      providing a clock which records a time at which a discrete frame is captured by the aiming device;
      providing a gyroscope which indicates how the aiming device is angled with respect to a vertical axis;
      providing a height measurement device which comprises a sensor that identifies a height with respect to a stationary entity;
      providing a coordinate recorder which receives information from the gyroscope, the height measurement device and the clock; and
   aiming the aiming device at a moving object having the image;
   transforming the image associated with the moving object, wherein the movement of said image is thereby reduced;
   displaying the transformed image, wherein said displaying step comprises projecting the transformed image on said at least one lens area;
   wherein said transforming step comprises providing a controller processing unit which accepts data relating to the moving image from the aiming device and the coordinate recorder and transform the data relating to the moving image into data relating to a non-moving image; and
   wherein said transforming step further comprises stabilizing the moving image relative to an eye of an individual viewing the moving image by inputting the successive discrete frames into a comparator which compares and shifts the successive discrete frames as necessary to stabilize the image prior to projection of the image.

14. The method according to claim 13, wherein said step of providing the aiming device comprises mounting the aiming device on a human head.

15. The method according to claim 14, wherein said step of providing the aiming device comprises providing eyeglasses.

16. The method according to claim 14, wherein said step of providing the aiming device comprises providing goggles.

17. The method according to claim 13, wherein said recording step comprises recording the moving image continuously.

18. The method according to claim 13, wherein said transforming step comprises stabilizing the moving image relative to an object external to an individual viewing the moving image.

19. The method according to claim 13, wherein said at least one lens area is transparent.

20. The method according to claim 13, wherein said at least one lens area is opaque.

21. The method according to claim 13, further comprising the step of recognizing an outer contour of the moving image.

22. A program storage device readable by machine, tangibly embodying a program of instructions executable by the machine to perform method steps for stabilizing an image, said method comprising the steps of:

provi­ding an aiming device, wherein said step of providing said aiming device comprises:

providing a camera which records a moving image, wherein said camera is adapted to record successive discrete frames of the moving image; and providing eyewear, wherein said eyewear comprising at least one lens area for being viewed;

providing a computer, wherein said step of providing said computer comprises:

providing a clock which records a time at which a discrete frame is captured by the aiming device;

providing a gyroscope which indicates how the aiming device is angled with respect to a vertical axis;

providing a height measurement device which comprises a sensor that identifies a height with respect to a stationary entity;

providing a coordinate recorder which receives information from the gyroscope. the height measurement device and the clock;

aiming the aiming device at a moving object having the image;

transforming the image associated with the moving object, wherein the movement of said image is thereby reduced;

displaying the transformed image, wherein said displaying step comprises projecting the transformed image on said at least one lens area;

wherein said transforming step comprises providing a controller processing unit which accepts data relating to the moving image from the aiming device and the coordinate recorder and transforms the data relating to the moving image into data relating to a non-moving image; and wherein said transforming step further comprises stabilizing the moving image relative to an eye of an individual viewing the moving image by inputting the successive discrete frames into a comparator which compares and shifts the successive discrete frames as necessary to stabilize the image prior to projection of the image.

* * * * *